(12) United States Patent  
Kohli et al.

(10) Patent No.: US 9,279,912 B2  
(45) Date of Patent: *Mar. 8, 2016

(54) ANTI-GLARE GLASS ARTICLE AND DISPLAY SYSTEM

(71) Applicant: Corning Incorporated, Corning, NY (US)

(72) Inventors: Jeffrey Todd Kohli, Corning, NY (US); Kelvin Nguyen, Macedon, NY (US); Lu Zhang, Taipei (TW)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/623,073

(22) Filed: Feb. 16, 2015

(65) Prior Publication Data

US 2015/0160376 A1    Jun. 11, 2015

Related U.S. Application Data

(62) Division of application No. 13/090,522, filed on Apr. 20, 2011, now Pat. No. 8,992,786.

(60) Provisional application No. 61/329,951, filed on Apr. 30, 2010.

(51) Int. Cl.
    *G02B 1/00*      (2006.01)
    *G02B 1/11*      (2015.01)
    *C03C 15/00*     (2006.01)
    *C03C 17/00*     (2006.01)

(52) U.S. Cl.
    CPC . *G02B 1/11* (2013.01); *C03C 15/00* (2013.01); *C03C 17/007* (2013.01); *C03C 2217/77* (2013.01); *C03C 2218/34* (2013.01); *Y10T 428/24355* (2015.01)

(58) Field of Classification Search
    CPC ......... G02B 1/11; C03C 15/00; C03C 17/007
    See application file for complete search history.

(56) References Cited

U.S. PATENT DOCUMENTS

| | | |
|---|---|---|
| 1,861,577 A | 6/1932 | Mattman |
| 3,616,098 A | 10/1971 | Falls |
| 4,451,329 A | 5/1984 | Batchelor et al. |

(Continued)

FOREIGN PATENT DOCUMENTS

| | | |
|---|---|---|
| CN | 101142148 | 3/2008 |
| DE | 198 28 172 A1 | 1/2000 |

(Continued)

OTHER PUBLICATIONS

Corning Gorilla® Glass, Collateral, www.corning.com, (Mar. 15, 2010), 2 pages.

*Primary Examiner* — Duy Deo
(74) *Attorney, Agent, or Firm* — John L. Haack

(57) ABSTRACT

A glass article including: at least one anti-glare surface having haze, distinctness-of-image, surface roughness, and uniformity properties, as defined herein. A method of making the article having an anti-glare surface includes, for example, forming a protective film on selected portions of at least one surface of the article; contacting the at least one surface with a liquid etchant; and removing the protective film from the surface of the article to form the anti-glare surface. A display system that incorporates the glass article, as defined herein, is also disclosed.

5 Claims, 10 Drawing Sheets

(56) References Cited

U.S. PATENT DOCUMENTS

| | | |
|---|---|---|
| 4,664,748 A | 5/1987 | Ueno et al. |
| 4,921,626 A | 5/1990 | Rhodenbaugh |
| 5,120,605 A | 6/1992 | Zuel et al. |
| 5,196,088 A | 3/1993 | Soda |
| 5,242,544 A | 9/1993 | Itoh et al. |
| 5,415,731 A | 5/1995 | Kim |
| 5,989,450 A | 11/1999 | Kim |
| 6,807,824 B1 | 10/2004 | Miwa |
| 2006/0074172 A1* | 4/2006 | Yang .............. G02B 1/113 524/492 |
| 2009/0071537 A1 | 3/2009 | Yavuzcetin et al. |
| 2010/0038342 A1 | 2/2010 | Lim et al. |
| 2011/0062849 A1* | 3/2011 | Carlson .............. C03C 15/00 313/110 |
| 2012/0218640 A1 | 8/2012 | Gallier et al. |

FOREIGN PATENT DOCUMENTS

| | | |
|---|---|---|
| JP | 2000114772 | 4/2000 |
| JP | 2010/076386 A | 4/2010 |
| WO | 02/053508 | 7/2002 |
| WO | 2006/087320 | 8/2006 |
| WO | 2009/104976 | 8/2009 |

* cited by examiner

Fig. 1a
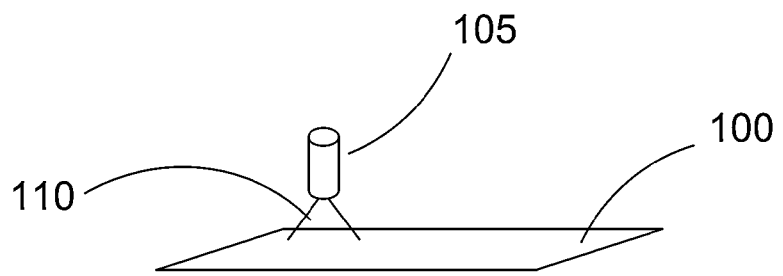
Fig. 1b
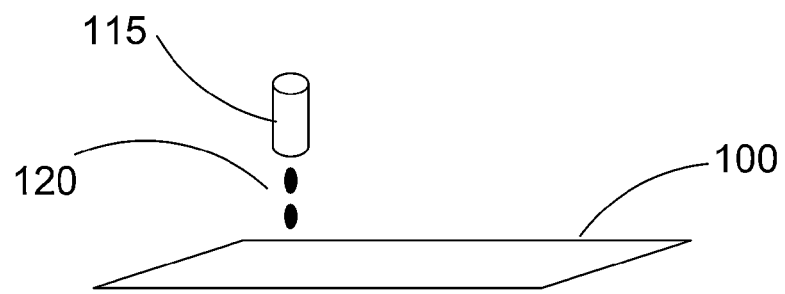
Fig. 1c
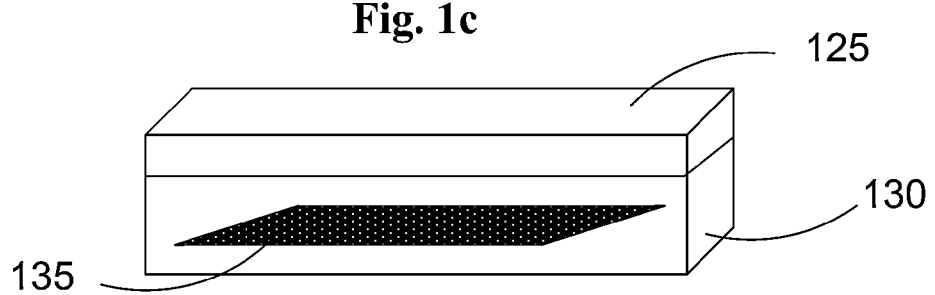
FIG. 1

Fig. 2a
Fig. 2b
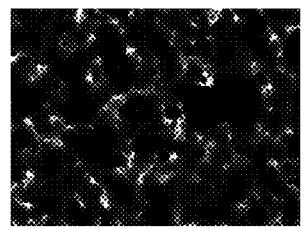
Fig. 2c
Fig. 2d
Fig. 2e
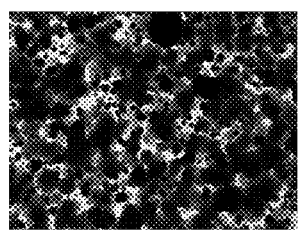
Fig. 2f
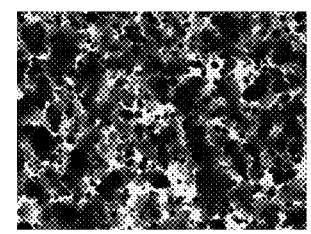
Fig. 2g
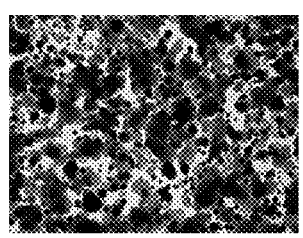
Fig. 2h
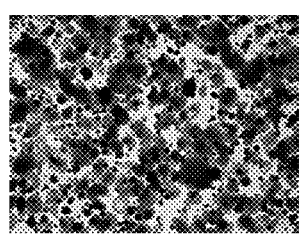
FIG. 2

Fig. 4a
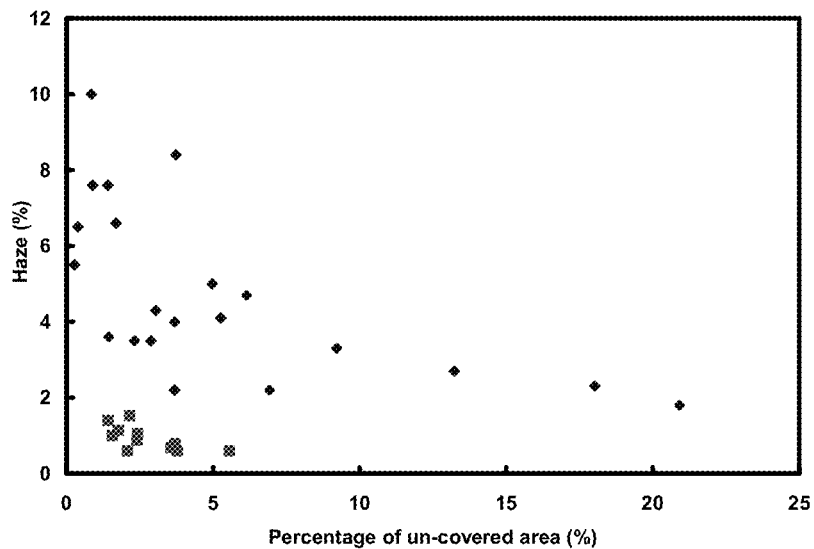
Fig. 4b
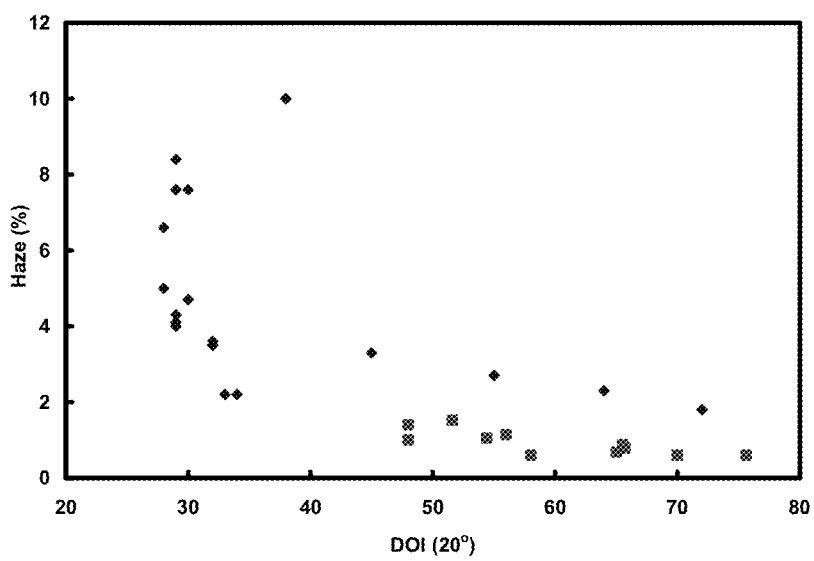
FIG. 4

Fig. 6a
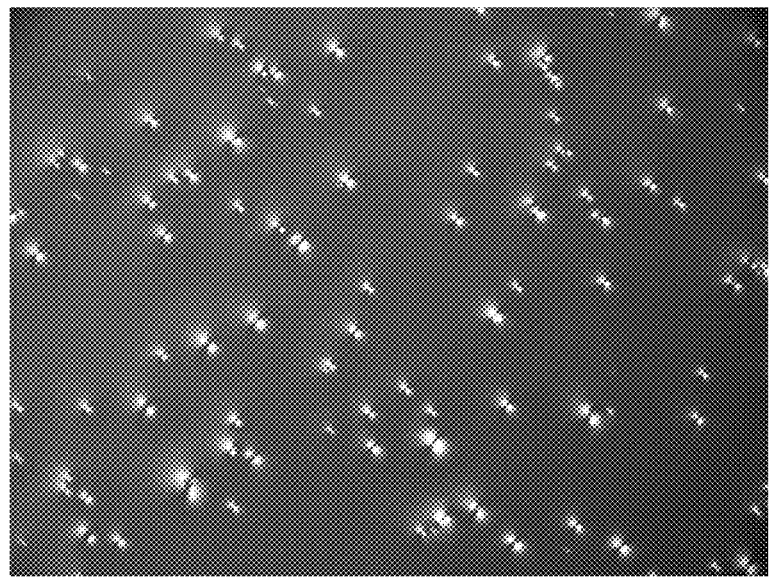
Fig. 6b
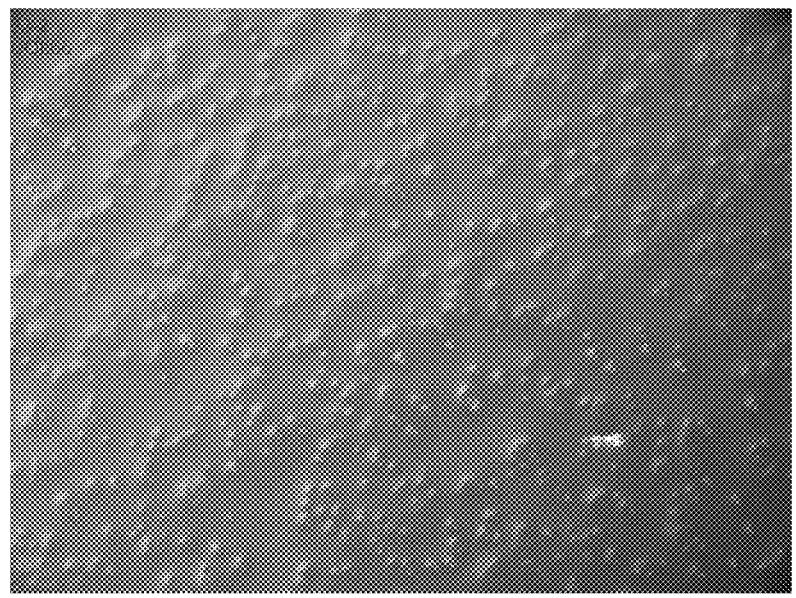
FIG. 6

Fig. 7a
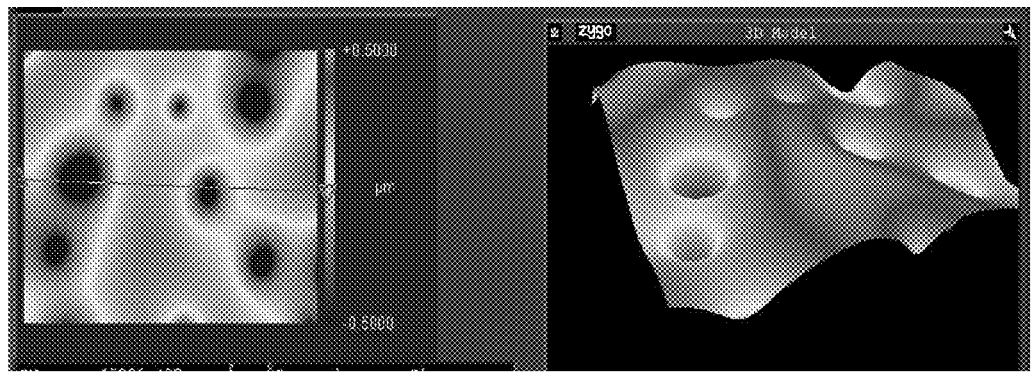
Fig. 7b
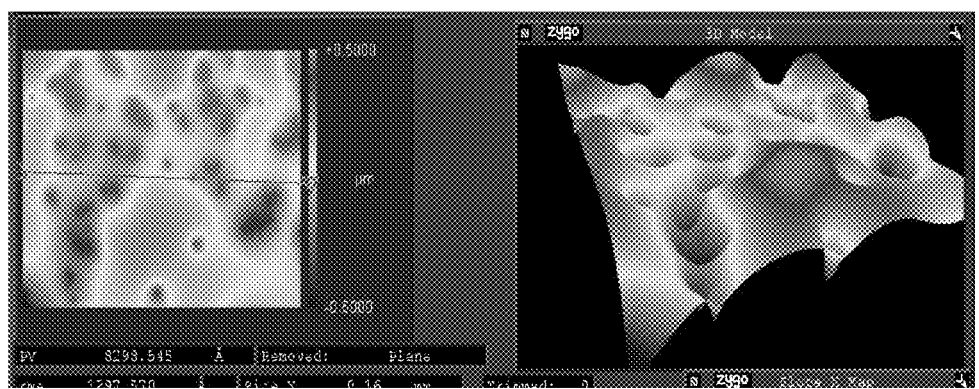
FIG. 7

Fig. 8a 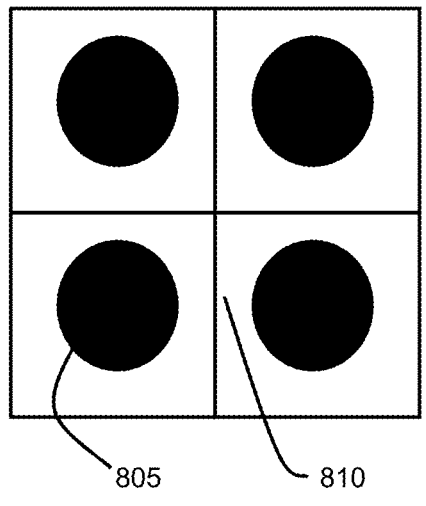 Fig. 8b 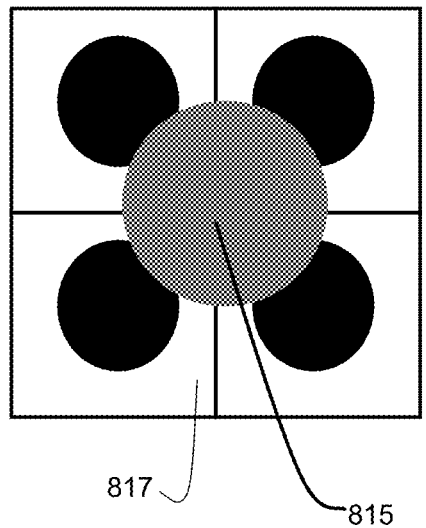
Fig. 8c 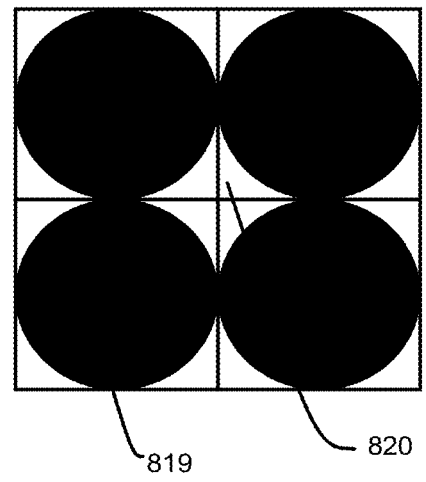 Fig. 8d 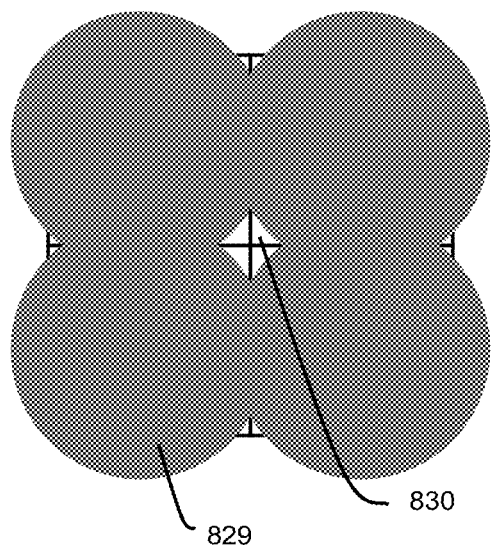
FIG. 8

ANTI-GLARE GLASS ARTICLE AND DISPLAY SYSTEM

The entire disclosure of any publication, patent, or patent document mentioned herein is incorporated by reference.

CROSS-REFERENCE TO RELATED APPLICATIONS

This application is a divisional of and claims priority from and the benefit of U.S. application Ser. No. 13/090,522, filed on Apr. 20, 2011, which claims the benefit of U.S. Patent Provisional Application Ser. No. 61/329,951, filed on Apr. 30, 2010, entitled "ANTI-GLARE SURFACE AND METHOD OF MAKING", the content of which is relied upon and incorporated herein by reference in its entirety.

BACKGROUND

The disclosure relates generally to anti-glare surfaces and to anti-glare articles incorporating the anti-glare surfaces, and to methods of making and using the anti-glare surfaces.

SUMMARY

The disclosure provides an anti-glare glass surface and anti-glare articles incorporating the anti-glare surfaces. The disclosure also provides methods of making and using the anti-glare surfaces.

BRIEF DESCRIPTION OF THE DRAWING(S)

In embodiments of the disclosure:

FIG. 1a to 1c illustrates aspects of the disclosed method of making an anti-glare glass surface and an anti-glare article.

FIGS. 2a to 2h show an exemplary series of microscope images of glass surfaces after the polymer was applied at decreasing surface coverages creating increasing pore area or exposed area.

FIG. 4a shows a relationship between the percentage of un-covered porous area from polymer masking, and haze after acid etching.

FIG. 4b shows a correlation between haze and DOI.

FIGS. 6a and 6b show two examples of microscopic images of glass surfaces after etching and mask removal; the respective masked precursors had different surface coverage or porosity that resulted in different appearance properties.

FIGS. 7a and 7b shows representative surface topography resulting from acid etching of a surface having a porous polymer mask.

FIGS. 8a to 8d show a series of simulated images representing a surface having varying amounts of deposited spots that can provide useful variation in the masked surface area coverage and pore size or exposed area.

DETAILED DESCRIPTION

Figure 3:
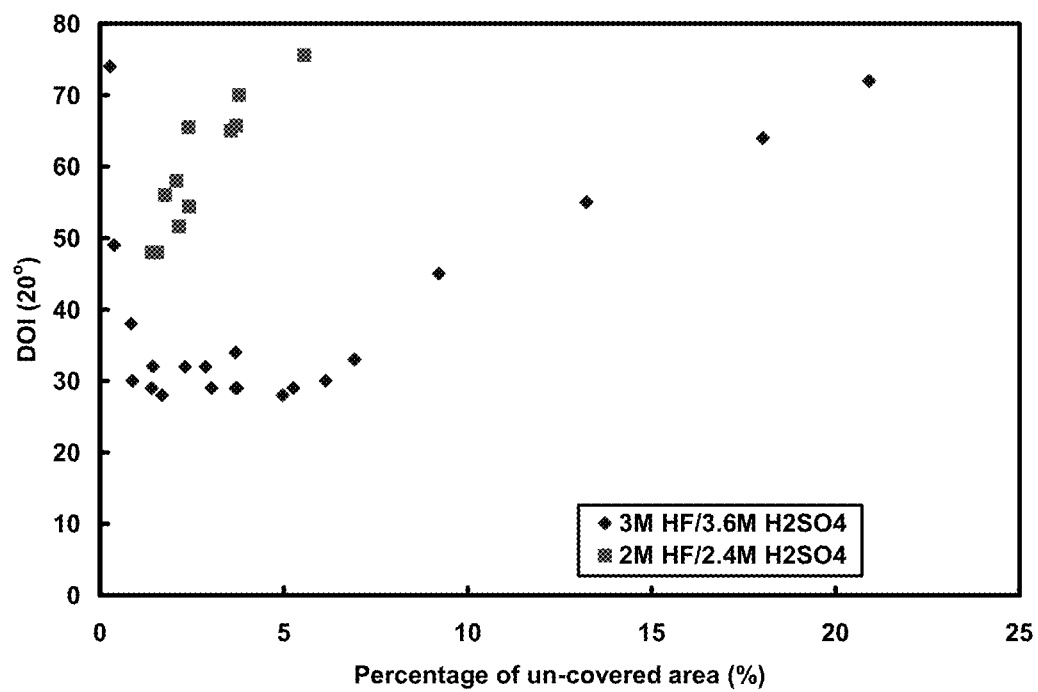
FIG. 3 shows the relationship between percentage of un-covered porous area on glass surface from polymer film masking and distinctness-of-image (DOI (20°)) after acid etching.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

DEFINITIONS

"Anti-glare" or like terms refer to a physical transformation of light contacting the treated surface of an article, such as a display, of the disclosure that changes, or to the property of changing light reflected from the surface of an article, into a diffuse reflection rather than a specular reflection. In embodiments, the surface treatment can be produced by mechanical or chemical etching. Anti-glare does not reduce the amount of light reflected from the surface, but only changes the characteristics of the reflected light. An image reflected by an anti-glare surface has no sharp boundaries. In contrast to an anti-glare surface, an anti-reflective surface is typically a thin-film coating that reduces the reflection of light from a surface via the use of refractive-index variation and, in some instances, destructive interference techniques.

"Pore," "porous," and like terms refers to, for example, microscopic or submicroscopic holes, gaps, non-coated areas, uncoated areas, or like openings or excluded areas in the temporary protective film or polymer layer. The pores or uncoated areas permit the topically applied etchant to penetrate the polymer coating and to contact the surface underlying the coated layer. The size of pore opening or pore diameter (i.e., the length of any straight line across the opening) can be, for example, from about 0.1 to about 50 micrometers, including intermediate values and ranges. The holes, gaps, or like openings in the coated layer can be formed by, for example: selectively depositing polymer droplets on the surface to be etched to from a spot array where the gaps or openings between the spots are accessible to the etchant; controlling the relative wetting characteristics of the surface to be etched, the pore-forming coating composition, or both; including a blowing agent in the polymer and then activating or "blowing" the agent by heat, light, or a combination thereof; including particles having differential solubility in the polymer formulation and dissolving the particles from the polymer surface film in advance of, or concurrently with, the acid etch, or like methods, after the coating has been deposited on the surface of the article, to form the porous surface layer.

"Distinctness-of-reflected image," "distinctness-of-image," "DOI" or like term is defined by method A of ASTM procedure D5767 (ASTM 5767), entitled "Standard Test Methods for Instrumental Measurements of Distinctness-of-Image Gloss of Coating Surfaces." In accordance with method A of ASTM 5767, glass reflectance factor measurements are made on the at least one roughened surface of the glass article at the specular viewing angle and at an angle slightly off the specular viewing angle. The values obtained from these measurements are combined to provide a DOI value. In particular, DOI is calculated according to equation (1):

$$DOI = \left[1 - \frac{Ros}{Rs}\right] \times 100 \qquad (1)$$

where Rs is the relative amplitude of reflectance in the specular direction and Ros is the relative amplitude of reflectance in an off-specular direction. As described herein, Ros, unless otherwise specified, is calculated by averaging the reflectance over an angular range from 0.2° to 0.4° away from the specular direction. Rs can be calculated by averaging the reflectance over an angular range of ±0.05° centered on the specular direction. Both Rs and Ros were measured using a goniophotometer (Novo-gloss IQ, Rhopoint Instruments) that is calibrated to a certified black glass standard, as specified in ASTM procedures D523 and D5767. The Novo-gloss instrument uses a detector array in which the specular angle is centered about the highest value in the detector array. DOI was also evaluated using 1-side (black absorber coupled to rear of glass) and 2-side (reflections allowed from both glass surfaces, nothing coupled to glass) methods. The 1-side measurement allows the gloss, reflectance, and DOI to be determined for a single surface (e.g., a single roughened surface) of the glass article, whereas the 2-side measurement enables gloss, reflectance, and DOI to be determined for the glass article as a whole. The Ros/Rs ratio can be calculated from the average values obtained for Rs and Ros as described above. "20° DOI," or "DOI 20°" refers to DOI measurements in which the light is incident on the sample at 20° off the normal to the glass surface, as described in ASTM D5767. The measurement of either DOI or common gloss using the 2-side method can best be performed in a dark room or enclosure so that the measured value of these properties is zero when the sample is absent.

For anti-glare surfaces, it is generally desirable that DOI be relatively low and the reflectance ratio (Ros/Rs) of eq. (1) be relatively high. This results in visual perception of a blurred or indistinct reflected image. In embodiments, the at least one roughened surface of the glass article has a Ros/Rs greater than about 0.1, greater than about 0.4, and, greater than about 0.8, when measured at an angle of 20° from the specular direction using the 1-side method measurement. Using the 2-side method, the Ros/Rs of the glass article at a 20° angle from the specular direction is greater than about 0.05. In embodiments, the Ros/Rs measured by the 2-side method for the glass article is greater than about 0.2, and greater than about 0.4. Common gloss, as measured by ASTM D523, is insufficient to distinguish surfaces with a strong specular reflection component (distinct reflected image) from those with a weak specular component (blurred reflected image). This can be attributable to the small-angle scattering effects that are not measurable using common gloss meters designed according to ASTM D523.

"Transmission haze," "haze," or like terms refer to a particular surface light scatter characteristic related to surface roughness. Haze measurement is specified in greater detail below.

"Roughness," "surface roughness (Ra)," or like terms refer to, on a microscopic level or below, an uneven or irregular surface condition, such as an average root mean squared (RMS) roughness or RMS roughness described below.

"Gloss," "gloss level," or like terms refer to, for example, surface luster, brightness, or shine, and more particularly to the measurement of specular reflectance calibrated to a standard (such as, for example, a certified black glass standard) in accordance with ASTM procedure D523, the contents of which are incorporated herein by reference in their entirety. Common gloss measurements are typically performed at incident light angles of 20°, 60°, and 85°, with the most commonly used gloss measurement being performed at 60°. Due to the wide acceptance angle of this measurement, however, common gloss often cannot distinguish between surfaces having high and low distinctness-of-reflected-image (DOI) values. The anti-glare surface of the glass article has a gloss (i.e.; the amount of light that is specularly reflected from sample relative to a standard at a specific angle) of up to 90 SGU (standard gloss units), as measured according to ASTM standard D523, and, in one embodiment, has a gloss in a range from about 60 SGU up to about 80 SGU. See also the DOI definition above.

"ALF" or "average characteristic largest feature size" or like terms refer to a measure of surface feature variation in the x- and y-direction as is discussed further below.

"Sparkle," "display sparkle," or like terms refer to the relationship between the size of features on the at least one roughened glass surface and pixel pitch, particularly the smallest pixel pitch, is of interest. Display "sparkle" is commonly evaluated by human visual inspection of a material that is placed adjacent to a pixelated display. ALF and its relationship to display "sparkle" has been found to be a valid metric for different materials having different surface morphologies, including glasses of varying composition and particle-coated polymer materials. A strong correlation between average largest characteristic feature size (ALF) and visual ranking of display sparkle severity exists across multiple different sample materials and surface morphologies. In embodiments, the glass article can be a glass panel that forms a portion of a display system. The display system can include a pixelated image display panel that is disposed adjacent to the glass panel. The smallest pixel pitch of the display panel can be greater than ALF.

"Uniformity," "uniform," or like terms refer to, for example, a chemically etched surface that appears homogeneous, and is free of detectable streaks, pin holes, blotches, and like defects. Alternatively, uniformity can be a measure of haze, DOI, and gloss. In embodiments, the variation of measured values within a sheet is less than about 10% of an average value. The visual inspection method is based on unaided eyes of a human viewer. Typically, a sample is placed under a 500+/−200 Lux fluorescent light with a black background, and the distance between viewer's eyes and samples is 30+/−5 cm. The sample is rotated during inspection, typically about ±45° from the starting position.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, and like values, and ranges thereof, employed in describing the embodiments of the disclosure, refers to variation in the numerical quantity that can occur, for example: through typical measuring and handling procedures used for making compounds, compositions, composites, concentrates or use formulations; through inadvertent error in these procedures;

through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture. The claims appended hereto include equivalents of these "about" quantities.

"Consisting essentially of" in embodiments refers, for example, an article having an anti-glare surface, to an anti-glare article, to a method of making an anti-glare article having an anti-glare surface and precursors thereto, devices incorporating the article having an anti-glare surface, or any apparatus of the disclosure, and can include the components or steps listed in the claim, plus other components or steps that do not materially affect the basic and novel properties of the compositions, articles, apparatus, or methods of making and use of the disclosure, such as particular reactants, particular additives or ingredients, a particular agents, a particular surface modifier or condition, or like structure, material, or process variable selected. Items that may materially affect the basic properties of the components or steps of the disclosure or that may impart undesirable characteristics to the present disclosure include, for example, a surface having objectionable high glare or high gloss properties, for example, having a haze, a distinctness-of-image, a surface roughness, a uniformity, or a combination thereof, that are beyond the values, including intermediate values and ranges, defined and specified herein.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "rt" for room temperature, "nm" for nanometers, and like abbreviations).

Specific and preferred values disclosed for components, ingredients, additives, and like aspects, and ranges thereof, are for illustration only; they do not exclude other defined values or other values within defined ranges. The compositions, apparatus, and methods of the disclosure can include any value or any combination of the values, specific values, more specific values, and preferred values described herein.

Chemically strengthened glasses are used in many hand-held and touch-sensitive devices as display windows and cover plates where resistance to mechanical damage can be significant to the visual appearance and functionality of the product.

Reduction in the specular reflection (a significant factor in glare) from these display surfaces is often desired, especially by manufacturers whose products are designed for outdoor use where glare can be exacerbated by sunlight. One way to reduce the intensity of the specular reflection, quantified as gloss, is to roughen the glass surface or cover it with a textured film. The dimensions of the roughness or texture should be large enough to scatter visible light, producing a slightly hazy or matte surface, but not too large as to significantly affect the transparency of the glass. Textured or particle-containing polymer films can be used when maintaining the properties (e.g., scratch resistance) of the glass substrate are not important. While these films maybe cheap and easy to apply, they are subject to abrasion which can reduce the display functionality of the device.

One result of roughening a glass surface is to create "sparkle," which is perceived as a grainy appearance. Sparkle is manifested by the appearance of bright and dark or colored spots at approximately the pixel-level size scale. The presence of sparkle reduces the viewability of pixilated displays, particularly under high ambient lighting conditions.

The makers of mobile phones, laptops, and other electronic devices are selecting glass, especially ion-strengthened glass, as the material of choice for the top cover piece on their flat panel display devices. To reduce the glare/reflection from the ambient environment on the glass surface during the use, there are two main methods: an anti-reflection (AR) coating or an anti-glare (AG) treatment. An AR coating reduces the refractive index difference between the display and ambient to achieve the effect. An AG treatment, through roughening the surface, causes the reflection to be scattered into different directions. Generally, to achieve comparable performance, an AR coating is more costly than an AG treatment.

An AG surface can be produced by roughening the display surface. The surface can be achieved with various methods, such as by AG coating or a chemically etched surface. For an AG coating, the surface can be coated with organic or non-organic droplets or particles. Such coatings can provide the scattering properties, but normally are not very resistant to scratches. Also, the coating may produce high sparkle, especially for high resolution (small pixels) devices. Chemically etched surfaces can meet all the optical requirements, including distinctness of image (DOI), haze, gloss, and sparkle. For example, the glass can be etched in an HF or buffered HF solution to roughen the surface. However, for many glass compositions, such direct etching cannot create a surface which meets all the optical and visual requirements. Typically, a more complex method has to be applied. U.S. Pat. Nos. 4,921,626, 6,807,824, 5,989,450, and WO2002053508, mention glass etching compositions and methods of etching glass with the compositions. One example uses ammonium bi-fluoride ($NH_4HF_2$) and a wetting agent, such as propylene glycol, to grow a thin layer of crystals on the surface (frost the surface), then removing the crystals with mineral acid and leave a very hazy surface. A final step dips the glass into the etchant, such as some combination of HF and mineral acid to reduce the haze to achieve the desired surface properties. The glass surface produced from the method can provide pleasing surface texture and meet the optical property specifications. However, several drawbacks, of existing processes include, for example: etch results are sensitive to chemical concentration(s), temperature, and purity of the etch solution; chemical material cost is high; and the surface glass thickness loss is typically high, e.g., about 50 to about 300 micrometer.

In embodiments, the disclosure provides a method of making an article having an anti-glare surface, comprising:

forming a protective film on selected portions of at least one surface of the article;

contacting the at least one surface with a liquid etchant; and removing the protective film from the surface of the article to form the anti-glare.

In embodiments, forming the protective film on selected portions of at least one surface can include, for example, selective spray deposition, masked spray deposition, ink jet deposition, screen printing, dip coating, aerosol spray, or a combination thereof. In embodiments, forming the protective film on selected portions of at least one surface can include, for example, creating an array of random spots. In embodiments, the spots can be, for example, substantially random, partially random, entirely random, or a combination thereof.

In embodiments, the spots can protect, for example, from about 50 to about 99 percent of the underlying surface area of the at least one surface. The spots can be, for example, substantially random, partially random, or a combination thereof.

The spots can have, for example, an average diameter of about 0.1 to about 1,000 micrometers and the areas on the at least one surface not covered by the spots have an average diameter of about 1 to about 50 micrometers.

In embodiments, the at least one surface can be, for example, a glass, a plastic, a composite, an ionically-exchanged strengthened glass, a thermally-tempered strengthened glass, or a combination thereof. In embodiments, the at least one surface can be, for example, substantially flat.

In embodiments, the liquid etchant can be, for example, a source of fluoride ion, a mineral acid, a buffer, or a combination thereof.

In embodiments, the contacting with the liquid etchant can be accomplished, for example, at from about 0.1 to about 15 minutes, at from about 1 to about 10 minutes, at from about 5 to about 10 minutes, and at from about 1 to about 5 minutes, including intermediate values and ranges.

In embodiments, the removing the protective film or pore-forming polymer from the surface of the article can be, for example, at least one of contacting the film with a dissolving liquid, heating the film to liquefy and drain, mechanical scrubbing, ultrasonic agitation, and like removal techniques, or a combination thereof.

In embodiments, the method can further include, for example, selecting at least one of a surface roughness (Ra), a surface haze, and a distinctness-of-image; and etching the surface according to an identified set of conditions (i.e., deterministic differential etch) to obtain the at least one of the selected surface roughness, surface haze, and distinctness-of-image properties for the anti-glare surface Conditions or factors that appear to be significant with respect to differential etch include, for example, polymer solubility in the etchant, polymer film thickness, the protonic to fluoride-ion acid-ratio, the etch time, the temperature (e.g., increased temperature generally increases film dissolution and substrate etch. The single side DOI value can be, for example, from about 40 to about 70 (for DOI 20°), and the haze is less than about 10%. The surface haze can be, for example, less than or equal to 50%, the surface roughness is less than about 800 nm, and the distinctness-of-image reflected is less than about 95.

In embodiments, the methods of making can further comprise including a wetting agent in any of the disclosed forming, contacting, or removing steps, the wetting agent can be, for example, at least one of a glycol, a glycerol, an alcohol, a surfactant, and like materials, or a combination thereof.

In embodiments, the glass article can be, for example, one of a soda lime silicate glass, an alkaline earth aluminosilicate glass, an alkali aluminosilicate glass, an alkali borosilicate glass, a boroaluminosilicate glass, and like materials, or a combination thereof.

In embodiments, the disclosure provides a method of making an article having an anti-glare surface, comprising:

contacting at least one surface of the article with a pore-forming polymer to form a porous layer on the contacted surface;

contacting the porous polymer layer with a liquid etchant; and removing the etchant-contacted porous polymer layer from the surface of the article to form the anti-glare surface.

In embodiments, the percentage of the porous surface area within the total polymer surface area coverage prior to contacting with etchant can be, for example, from about 0.1 to about 30%, from about 0.1 to about 25%, about 0.1 to about 5%, about 0.3 to about 3%, and about 1 to about 3%, including intermediate values and ranges.

In embodiments, the pore-forming polymer can be, for example, at least one of a sulfonamide formaldehyde resin, a nitrocellulose, a polymer or copolymer including an acrylate or acrylic monomer or salts thereof, a lacquer, an enamel, a wax, and like materials, or a combination thereof.

In embodiments, the contacting of the porous polymer layer with the liquid etchant can be accomplished, for example, at from about 0.1 to about 5 minutes. In embodiments, the removing of the etchant-contacted porous polymer layer from the surface of the article can be accomplished, for example, using at least one of contacting the polymer layer with a dissolving liquid, heating polymer layer to liquefy and drain, and like removal methods, or a combination thereof.

In embodiments, the at least one surface can be, for example, a glass, a plastic, a composite, an ionically-exchanged strengthened glass, a thermally-tempered strengthened glass, and like materials, or a combination thereof. The at least one surface can be, for example, a substantially macroscopically flat glass sheet.

In embodiments, the protective film or pore-forming polymer can be any suitable coating material, for example, at least one polymer, or a combination of polymers, and like natural or synthetic materials, or a combination thereof. Suitable pore-former compositions, which can provide durable yet removable porous coatings can be, for example, any polymer or polymer formulation, or like material or mixtures, having film-forming and pore-forming properties, such as TSO-3100 DOD ink (an ethanol isopropyl-based jettable ink from Diagraph), an acetone-based o/p-toluene sulfonamide formaldehyde resin, a nitrocellulose, an acrylate polymer, an acrylate copolymer, a lacquer (a polymer dissolved in a volatile organic compound) formulation, an enamel, a wax, and like materials, or combinations thereof. In embodiments, if desired, the gloss, haze, DOI, uniformity, or like appearance properties of the intermediate film coated substrate or article can be adjusted or modified by any method compatible with the overarching methods and articles of the disclosure.

Suitable acrylate polymers or copolymers (i.e., having two or more different monomers) can include, for example, acrylic acid, methacrylic acid, or one of their esters, and like monomers, or combinations thereof, and salts thereof. Other polymers and copolymers of acrylic acid and salts thereof, such as sodium, calcium, magnesium, zinc, ammonium and like ions, and another monomer can include, for example, ammonium acrylate copolymer, ammonium vinyl alcohol (va) acrylate copolymer, sodium acrylate copolymer, ethylene acrylic acid copolymer, ethylene acrylate copolymer, ethylene acrylic acid-va copolymer, acrylate vinyl pyridine (vp) copolymer, acrylate-va copolymer, steareth-10 allyl ether acrylate copolymer, acrylate steareth-50 acrylate copolymer, acrylate steareth-20 methacrylate copolymer, acrylate ammonium methacrylate copolymer, styrene acrylate copolymer, styrene acrylate ammonium methacrylate copolymer, ammonium styrene acrylate copolymer, sodium styrene acrylate copolymer, acrylate hydroxyester acrylate copolymer, methacryloyl ethyl betaine acrylate copolymer, lauryl acrylate-va copolymer, va-butyl maleate isobornyl acrylate copolymer, ethylene methacrylate copolymer, vinyl caprolactam-vp dimethylaminoethyl methacrylate copolymer, sodium acrylate acrolein copolymer, vp-dimethylaminoethylmethacrylate copolymer, and like copolymers, and mixtures thereof. Polymers of acrylic acid and salts thereof can be, for example, polyacrylic acid, ammonium polyacrylate, potassium aluminum polyacrylate, potassium polyacrylate, sodium polyacrylate, and like polymers, and mixtures thereof including mixtures with copolymers or another film former.

Additionally or alternatively, the pore-former composition can include or can be selected from materials that can form a breathable film, that is, the film is permeable to, for example, oxygen, or like gases, and liquids such as the etchant or stripping liquid(s) such as water or other suitable solvent that can remove the porous polymer coating or breathable film from the surface post-etch.

In embodiments, the disclosure provides methods for making anti-glare surfaces by etching a surface having a porous coating including, for example, a selectively applied coating. Unlike the highly regular porous patterns prepared in the lithographic arts by mask-etch processes (see for example, U.S. Pat. No. 7,517,466; P. Mansky, et al., *Appl. Phys. Lett.*, Vol. 68, No. 18, p. 2586-2588; M. Park, et al., *Science*, Vol. 276, 1401-1406), the present disclosure favors porous masked surfaces or spotted surfaces having an irregular or a random distribution of any of the spots, pores, open areas, masked areas, and like dispositions of spots and pores, or combinations thereof.

In embodiments, the surface mask spotting or pore-formation can be accomplished by contacting the at least one surface of the article using any suitable coating method with any suitable coating material, such as, by selective application, for example, on a microscopic or submicroscopic scale, with a spray coater or like device or method.

The liquid etchant can be, for example, a source of fluoride ion, a mineral acid, a buffer, or a combination thereof. The source of fluoride can be, for example, a salt selected from ammonium fluoride, ammonium bi-fluoride, sodium fluoride, sodium bi-fluoride, potassium fluoride, potassium bi-fluoride, and like salts, or a combination thereof. The mineral acid can be, for example, one of sulfuric acid, hydrochloric acid, nitric acid, and phosphoric acid, and like acids, or a combination thereof.

The contacting of the porous polymer layer with the liquid etchant can be, for example, accomplished at from about 0.1 to about 5 minutes. The removing of the etchant-contacted porous polymer layer from the surface of the article can be, for example, at least one of: contacting the polymer layer with a dissolving liquid, heating polymer layer to liquefy and draining the liquid polymer, or a combination thereof. The selecting of at least one of a surface roughness (Ra), a surface haze, and a distinctness-of-image, or a combination thereof; and etching the surface according to an identified set of conditions, for example, etching with a mixture of 2 M HF and 2.4 M $H_2SO_4$ for 1 min, to obtain the at least one of the selected surface roughness, surface haze, and distinctness-of-image. In embodiments, a single-side DOI value can be, for example, from about 40 to about 70 (for DOI 20°), and the haze is less than about 10%. The surface haze can be, for example, less than or equal to 50%, the surface roughness is less than about 800 nm, and the distinctness-of-image reflected is less than about 95. The method can further include a wetting agent comprising at least one of a glycol, a glycerol, an alcohol, a surfactant, or a combination thereof. The glass article can be, for example, one of a soda lime silicate glass, an alkaline earth aluminosilicate glass, an alkali aluminosilicate glass, an alkali borosilicate glass, and like glasses, or combinations thereof. The glass article can be, for example, an alkali aluminosilicate glass comprising: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≤$Li_2O+Na_2O+K_2O$≤20 mol % and 0 mol %≤MgO+CaO≤10 mol %. The alkali aluminosilicate glass can be, for example: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO; or for example: 60-72 mol % $SiO_2$; 9-16 mol % $Al_2O_3$; 5-12 mol % $B_2O_3$; 8-16 mol % $Na_2O$; and 0-4 mol % $K_2O$, where the ratio $$\frac{Al_2O_3(\text{mol \%}) + B_2O_3(\text{mol \%})}{\sum \text{alkali metal modifiers (mol \%)}} > 1.$$

In embodiments, the disclosure provides a glass article comprising: at least one anti-glare surface having:
 a. a haze of less than about 25%;
 b. a distinctness-of-image (DOI 20°) of about 25 to about 90; and
 c. a surface roughness (Ra) of about 100 to about 300 nm.

In embodiments, the glass article can have good to excellent uniformity properties, that is, an absence of detectable streaks, pin holes, blotches, and like defects. The glass article can be, for example, a sheet of the glass which provides a protective cover for at least one of a hand held electronic device, an information-related terminal, or a touch sensor device. The anti-glare surface of the glass article can be, for example, a distribution of topographic features having an average diameter of about 1 to about 50 micrometers. The anti-glare surface can be, for example, a protective cover glass for a display device, such as an information display device, a media display device, and like devices.

In embodiments, the disclosure provides a display system including, for example:
 a glass panel having at least one roughened surface including a haze of less than about 25%; a distinctness-of-image (DOI 20°) of about 25 to about 90; and a surface roughness (Ra) of about 100 to about 300 nm, which properties provide an anti-glare surface; and
 a pixelated image-display panel adjacent to the glass panel.

In embodiments, the disclosure provides methods of making a glass article having an anti-glare surface, and methods of forming an anti-glare surface on a surface of a glass article.

In embodiments, the disclosure provides a wet etch method for generating an anti-glare surface on the glass while preserving its inherent mechanical surface properties. During the process, a glass surface having a porous polymer layer is exposed to chemicals which can preferentially degrade the glass surface to alter the surface roughness dimensions that are responsible for scattering visible light. When significant quantities of mobile alkali ions are present in the glass, such as in soda lime silicate glasses, a roughened surface can be formed by, for example, contacting the glass surface, or a portion of the glass surface, or access restricted portions of the glass surface, in or with an acid etchant solution, such as a solution containing fluoride ion.

In embodiments, the disclosure provides methods of making anti-glare (AG) glass surfaces including applying an organic coating material, mainly polymer on the glass surface; and contacting the coated glass with HF or a combination of HF and other acid(s) etchants to create the AG surface. During the etching, the polymer acts as a non-uniform, temporary, mask on the glass surface. The applied polymer forms a porous film on the glass. In acid, the uncovered or porous film area will be etched, while the polymer film covered area will be protected, leading to a differential etching. Such differential etching leads to a roughened, non-uniform surface. The polymer can be applied to the surface by various methods as long as the size and percentage of the porous opening can be controlled. The polymer application methods can include, for example, spray coating, ink-jet print, dipping coating, and like method or combinations thereof.

Particularly significant aspects of the disclosure of using a porous polymer mask to create an AG surface include, for example:

Good optical properties: a good DOI value (less than about 70 for 20° DOI) can easily be achieved. The haze can be less than about 10% and sparkle is similar or better than that of chemically etched samples. Typically, for single-side etched glass, the DOI 20° can be, for example, less than about 100, such as about 50 to about 70, haze can be less than about 10%, and less sparkle is generally desired.

Short process times (high throughput): after the polymer is applied to the glass surface, the etching time in acid is less than about 10 min, in many instances only about 1 min may be used. The etch time can be much shorter than the multiple-bath chemical etching system, which abbreviated etch process can provide higher throughput.

Scalability: the methods, such as spray coating or ink jet polymer application to glass sheets are very scalable from small to large sheets. The etching process, for example, using vertical or horizontal immersion, or spraying acid, is also scalable.

Flexibility to achieve different levels of optical properties: the optical properties of AG surface, especially DOI, can be adjusted with different process conditions, or independently using, for example, different acid concentration or etch time. This process can be used for different types of glass compositions without significant adjustment. For the etch process, the etching chemistry may be changed depending on the glass composition.

Small glass thickness loss: since the etch time in is acid typically only about 1 min, the glass thickness loss can be less than about 20 micrometers, less than about 10 micrometers, less than about 5 micrometers, and less than about 2 micrometers, including intermediate values and ranges.

Simple process and low cost: the disclosed process can use only a simple bath for etching after the polymer is applied, which is simpler than multiple chemical etch system. The disclosed process can significantly reduce the total cost of etch chemicals consumed.

Wide range of polymer selection: the polymers useful in disclosed process can be selected from wide range, including, for example, polymer ink and UV curable ink.

These and other aspects of the disclosure are illustrated and demonstrated herein.

In embodiments, the article comprises, consists essentially of, or consists of one of a soda lime silicate glass, an alkaline earth aluminosilicate glass, an alkali aluminosilicate glass, an alkali borosilicate glass, and combinations thereof. Examples of such glasses are described herein. For additional definitions, descriptions, and methods of silica materials and related metal oxide materials, see for example, R. K. Iler, *The Chemistry of Silica*, Wiley-Interscience, 1979.

In embodiments, the glass article can be a transparent or semi-transparent glass sheet, such as those used as cover plates and windows for display and touch screen applications, for example, portable communication and entertainment devices such as telephones, music players, video players, or like devices; and as display screens for information-related terminal (IT) (e.g., portable or laptop computers) devices; and like applications. The glass article or substrate can have a thickness of up to about 3 millimeters (mm). In embodiments, the thickness can be from about 0.2 to about 3 mm. In embodiments, the glass article can have at least one surface that is unpolished. In embodiments, the step of coating the surface of the article or substrate can include additional optional preparative, pretreatment, or post-treatment procedures, for example, removing oil, foreign matter, or other debris that may inhibit etching from the at least one surface using methods known in the art, including, for example, washing with soaps or detergents, ultrasonic cleaning, treatment with surfactants, and like methods.

When a single-side acid-etch is desired on a sheet of glass, one side of the glass can be protected from the etching solution. Protection can be achieved by applying an insoluble non-porous coating such as an acrylic wax, or laminate film having an adhesive layer, for example, acrylic, silicone, and like adhesives materials, or combinations thereof. Coating application methods can include, for example, brushing, rolling, spraying, laminating, and like methods. The acid etch exposed insoluble non-porous coating survives the etching process and can be readily removed after processing, such as contemporaneously or separately from the removal of the protective film or porous polymer layer.

In embodiments, a glass article is provided. The glass article can be ion-exchangeable and has at least one roughened surface. The roughened surface has a distinctness-of-reflected image (DOI) of less than 90 when measured at an incidence angle of 20°. A pixelated display system that includes the glass article is also provided. The glass article can be, for example, a planar sheet or panel having two major surfaces joined on the periphery by at least one edge, although the glass article can be formed into other shapes such as, for example, a three-dimensional shape. At least one of the surfaces is a roughened surface including, for example, topological or morphological features, such as, projections, protrusions, depressions, pits, closed or open cell structures, particles, and like structures or geometries, or combinations thereof.

In embodiments, the disclosure provides an aluminosilicate glass article. The aluminosilicate glass article comprises at least 2 mol % $Al_2O_3$, can be ion-exchangeable, and has at least one roughened surface. The aluminosilicate glass article has at least one roughened surface comprising a plurality of topographical features. The plurality of topographical features can have an average characteristic largest feature size (ALF) of from about 1 micrometer to about 50 micrometers.

In embodiments, the disclosure provides a display system. The display system can include at least one aluminosilicate glass panel and a pixelated image-display panel adjacent to the aluminosilicate glass panel. The image-display panel has a minimum native pixel pitch dimension. The average characteristic largest feature size of the glass panel can be less than the minimum native pixel pitch dimension of the display panel. The pixelated image display panel can be, for example, one of an LCD display, an OLED display, or like display devices. The display system can also include touch-sensitive elements or surfaces. The aluminosilicate glass can be ion-exchanged and has at least one roughened surface comprising a plurality of features having an average largest feature size, or ALF, and the image-displaying panel has a minimum native pixel pitch. The minimum native pixel pitch can be, for example, greater than the ALF of the roughened surface of the aluminosilicate glass panel.

ALF is measured in the plane of (i.e., in the x- and y-direction or parallel to) the roughened glass surface, and is therefore independent of roughness. Roughness is a measurement of feature variation in the z-direction (thickness direction), perpendicular to the roughened glass surface. Selecting the largest characteristic features is an important distinction from other methods that determine a more global average feature size. The largest features are most easily seen by the human eye and are therefore most important in determining visual acceptance of the glass article. In embodiments, the topological or morphological features of the at least one roughened surface has an average characteristic largest feature (ALF) size of from about 1 micrometer to about 50 micrometers, of from about 5 micrometers to about 40 micrometers; of from about micrometers to about 30 micrometers; and from about 14 micrometers to about 28 micrometers. The average characteristic largest feature size is the average cross-sectional linear dimension of the largest 20 repeating features within a viewing field on a roughened surface. A standard calibrated optical light microscope can typically be used to measure feature size. The viewing field is proportional to the feature size, and typically has an area of approximately 30(ALF)×30(ALF). If, for example, the ALF is approximately 10 micrometers, then the viewing field from which the 20 largest features are selected is approximately 300 micrometers×300 micrometers. Small changes in the size of the viewing field do not significantly affect ALF. The standard deviation of the 20 largest features that are used to determine ALF should generally be less than 40% of the average value, i.e., major outliers should be ignored since these are not considered "characteristic" features.

The topography of the anti-glare surface can include, for example, features such as protrusions or projections, depressions, and the like having a maximum dimension of less than about 400 nm. In embodiments, these topographical features can be separated from each other or spaced apart at a mean distance of from about 10 nm up to about 200 nm. The resulting anti-glare surface can have an average roughness, as measured by the peak-to-valley difference (PV) measure on the surface. In embodiments, the anti-glare surface can have a RMS roughness of about 800 nm, of about 500 nm, and about 100 nm.

The features used to calculate ALF are "characteristic;" i.e., at least 20 similar features can be located in the proportional viewing field. Different morphologies or surface structures can be characterized using ALF. For example, one surface structure may appear to be closed-cell repeating structures, another may appear to be small pits separated by large plateaus, and a third may appear to be a field of small particles punctuated by intermittent large smooth regions. In each case, the ALF is determined by measuring the largest 20 repeating surface regions that are substantially optically smooth. In the case of the repeating closed cell surface structure, the features to be measured are the largest of the cells in the closed-cell matrix. For the surface structure comprising small pits separated by large plateaus, the large plateaus between pits are to be measured. For the surface comprising a field of small particles punctuated by intermittent large smooth regions, the intermittent large smooth regions are to be measured. All surfaces with substantially varying morphologies can thus be characterized using ALF.

In embodiments, the at least one roughened surface of the glass article has an average RMS roughness can be from about 10 nm to about 800 nm. In embodiments, the average RMS roughness can be from about 40 nm to about 500 nm. In embodiments, the average RMS roughness can be from about 40 nm to about 300 nm. In embodiments, the average RMS roughness can be greater than about 10 nm and less than about 10% of the ALF. In embodiments, the average RMS roughness can be greater than about 10 nm and less than about 5% of ALF, and greater than about 10 nm and less than about 3% of ALF.

The specification of low DOI and high Ros/Rs provide constraints on the characteristic feature size and ALF. For a given roughness level, it has been found that larger feature sizes result in lower DOI and higher Ros/Rs. Therefore, to balance the display sparkle and the DOI target, in embodiments, it can be desirable to create anti-glare surfaces having an intermediate characteristic feature size that is neither too small nor too large. It is also desirable to minimize reflected or transmitted haze when the transmitted haze is scattering into very high angles that can cause a milky white appearance of a roughened article under ambient lighting.

"Transmission haze," "haze," or like terms refer to the percentage of transmitted light scattered outside an angular cone of ±4.0° according to ASTM D1003. For an optically smooth surface, transmission haze is generally close to zero. Transmission haze of a glass sheet roughened on two sides (Haze$_{2-side}$) can be related to the transmission haze of a glass sheet having an equivalent surface that is roughened on only one side (Haze$_{1-side}$), according to the approximation of eq. (2):

$$\text{Haze}_{2-side} \approx [(1-\text{Haze}_{1-side}) \cdot \text{Haze}_{1-side}] + \text{Haze}_{1-side} \qquad (2).$$

Haze values are usually reported in terms of percent haze. The value of Haze$_{2-side}$ from eq. (2) must be multiplied by 100. In embodiments, the disclosed glass article can have a transmission haze of less than about 50% and even less than about 30%.

A multistep surface treatment process has been used to form the roughened glass surface. An example of a multistep etch process is disclosed in commonly owned copending U.S. Provisional Patent Appln 61/165,154, filed Mar. 31, 2009, to Carlson, et al., entitled "Glass Having Anti-Glare Surface and Method of Making," where a glass surface is treated with a first etchant to form crystals on the surface, then etching a region of the surface adjacent to each of the crystals to a desired roughness, followed by removing the crystals from the glass surface, and reducing the roughness of the surface of the glass article to provide the surface with a desired haze and gloss.

The contacting with etchant can involve, for example, selective partial or complete dipping, spaying, immersion, and like treatments, or combination of treatments with an acidic etch solution including, for example, 2 to 10 wt % hydrofluoric acid and 2 to 30 wt % of a mineral acid, such as hydrochloric acid, sulfuric acid, nitric acid, phosphoric acid, and like acids, or combinations thereof. In embodiments, a general etch trend appears to be that fluoride ion concentrations tend to influence the extent of glass substrate etching, and protic acid concentrations tend to influence the extent of protective coating degradation during substrate etching. The glass surface can be etched in the solution for periods of from about 1 to about 10 minutes, with longer times generally leading to a greater surface roughness. The disclosed concentrations and etch times are representative of suitable examples. Concentrations and etch times outside the disclosed ranges can also be used to obtain the roughened surface of the glass article albeit potentially less efficiently.

In chemical strengthening, larger alkali metal ions are exchanged for smaller mobile alkali ions near the glass surface. This ion-exchange process places the surface of the glass in compression, allowing it to be more resistant to any mechanical damage. In embodiments, the outer surface of the glass article can optionally be ion-exchanged where smaller metal ions are replaced or exchanged by larger metal ions having the same valence as the smaller ions. For example, sodium ions in the glass can be replaced with larger potassium ions by immersing the glass in a molten salt bath containing potassium ions. The replacement of smaller ions with larger ions creates a compressive stress within the layer. In embodiments, the larger ions near the outer surface of the glass can be replaced by smaller ions, for example, by heating the glass to a temperature above the strain point of the glass. Upon cooling to a temperature below the strain point, a compressive stress is created in an outer layer of the glass. Chemical strengthening of the glass can optionally be performed after the surface roughening treatment, with little negative effect on the ion-exchange behavior or the strength of the glass article.

With a proper design selection, the disclosed process does not need backside protection to make single-sided samples. Single-sided samples can be prepared using for example, single-side dip, spray, or spin coating methods. A multi-bath conventional process needs backside protection film, which can increase manufacturing costs.

In embodiments, the alkali aluminosilicate glass comprises, consists essentially of, or consists of, for example: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≤$Li_2O+Na_2O+K_2O$≤20 mol % and 0 mol %≤MgO+CaO≤10 mol %. In embodiments, the alkali aluminosilicate glass can comprise, consists essentially of, or consists of, for example: 60-72 mol % $SiO_2$; 9-16 mol % $Al_2O_3$; 5-12 mol % $B_2O_3$; 8-16 mol % $Na_2O$; and 0-4 mol % $K_2O$. In embodiments, the alkali aluminosilicate glass can comprise, consists essentially of, or consists of: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO. In embodiments, the glass can be batched with 0 to 2 mol % of at least one fining agent, such as $Na_2SO_4$, NaCl, NaF, NaBr, $K_2SO_4$, KCl, KF, KBr, $SnO_2$, or combinations thereof. The aluminosilicate glass, in embodiments, can be substantially free of lithium. In embodiments, the aluminosilicate glass can be substantially free of at least one of arsenic, antimony, barium, or combinations thereof.

In embodiments, the selected glass can be, for example, down drawable, i.e., formable by methods such as slot draw or fusion draw processes that are known in the art. In these instances, the glass can have a liquidus viscosity of at least 130 kpoise. Examples of alkali aluminosilicate glasses are described in commonly owned and assigned U.S. patent application Ser. No. 11/888,213, to Ellison, et al., entitled "Down-Drawable, Chemically Strengthened Glass for Cover Plate," filed Jul. 31, 2007, having priority to U.S. Provisional Appln 60/930,808, filed May 22, 2007; U.S. patent application Ser. No. 12/277,573, to Dejneka, et al., entitled "Glasses Having Improved Toughness and Scratch Resistance," filed Nov. 25, 2008, which claims priority from U.S. Provisional Appln 61/004,677, filed Nov. 29, 2007; U.S. patent application Ser. No. 12/392,577, to Dejneka, et al., entitled "Fining Agents for Silicate Glasses," filed Feb. 25, 2009, which claims priority from U.S. Provisional Appln No. 61/067,130, filed Feb. 26, 2008; U.S. patent application Ser. No. 12/393, 241, to Dejneka, et al., entitled "Ion-Exchanged, Fast Cooled Glasses," filed Feb. 26, 2009, which claims priority to U.S. Provisional Appln No. 61/067,732, filed Feb. 29, 2008; U.S. patent application Ser. No. 12/537,393, to Barefoot, et al., entitled "Strengthened Glass Articles and Methods of Making," filed Aug. 7, 2009, having priority to U.S. Provisional Appln No. 61/087,324, entitled "Chemically Tempered Cover Glass," filed Aug. 8, 2008; U.S. Provisional Patent Appln No. 61/235,767, to Barefoot, et al., entitled "Crack and Scratch Resistant Glass and Enclosures Made Therefrom," filed Aug. 21, 2009; and U.S. Provisional Patent Appln No. 61/235,762, to Dejneka, et al., entitled "Zircon Compatible Glasses for Down Draw," filed Aug. 21, 2009.

The glass surfaces and sheets described in the following example(s) can use any suitable coatable and etchable glass substrate or like substrates, including for example, the glass compositions 1 through 11 listed in Table 1.

TABLE 1

Representative glass compositions.

| Oxides (mol %) | Glass | | | | | | | | | | |
| --- | --- | --- | --- | --- | --- | --- | --- | --- | --- | --- | --- |
| | 1 | 2 | 3 | 4 | 5 | 6 | 7 | 8 | 9 | 10 | 11 |
| $SiO_2$ | 66.16 | 69.49 | 63.06 | 64.89 | 63.28 | 67.64 | 66.58 | 64.49 | 66.53 | 67.19 | 70.62 |
| $Al_2O_3$ | 10.29 | 8.45 | 8.45 | 5.79 | 7.93 | 10.63 | 11.03 | 8.72 | 8.68 | 3.29 | 0.86 |
| $TiO_2$ | 0 | — | — | — | — | 0.64 | 0.66 | 0.056 | — | 0.004 | 0.089 |
| $Na_2O$ | 14 | 14.01 | 15.39 | 11.48 | 15.51 | 12.29 | 13.28 | 15.63 | 10.76 | 13.84 | 13.22 |
| $K_2O$ | 2.45 | 1.16 | 3.44 | 4.09 | 3.46 | 2.66 | 2.5 | 3.32 | 0.007 | 1.21 | 0.013 |
| $B_2O_3$ | 0.6 | — | 1.93 | — | 1.9 | — | — | 0.82 | — | 2.57 | — |
| $SnO_2$ | 0.21 | 0.185 | — | — | 0.127 | — | — | 0.028 | — | — | — |
| BaO | 0 | — | — | — | — | — | — | 0.021 | 0.01 | 0.009 | — |
| $As_2O_3$ | 0 | — | — | — | — | 0.24 | 0.27 | | — | 0.02 | — |
| $Sb_2O_3$ | — | — | 0.07 | — | 0.015 | — | 0.038 | 0.127 | 0.08 | 0.04 | 0.013 |
| CaO | 0.58 | 0.507 | 2.41 | 0.29 | 2.48 | 0.094 | 0.07 | 2.31 | 0.05 | 7.05 | 7.74 |
| MgO | 5.7 | 6.2 | 3.2 | 11.01 | 3.2 | 5.8 | 5.56 | 2.63 | 0.014 | 4.73 | 7.43 |
| $ZrO_2$ | 0.0105 | 0.01 | 2.05 | 2.4 | 2.09 | — | — | 1.82 | 2.54 | 0.03 | 0.014 |
| $Li_2O$ | 0 | — | — | — | — | — | — | — | 11.32 | — | — |
| $Fe_2O_3$ | 0.0081 | 0.008 | 0.0083 | 0.008 | 0.0083 | 0.0099 | 0.0082 | 0.0062 | 0.0035 | 0.0042 | 0.0048 |
| SrO | — | — | — | 0.029 | — | — | — | — | — | — | — |

In embodiments, a particularly useful and popular glass composition for use in the disclosed process is Code 2318 glass (see composition 2 in Table 1), commercially available from Corning, Inc. (i.e., Corning® Gorilla® glass; see for example, www.corning.com) (see U.S. Provisional Patent Application 61/235,762, supra.). The Code 2318 glass can have a composition specified within the following combined ranges, for example: 61 mol %≤$SiO_2$≤75 mol %; 7 mol %≤$Al_2O_3$≤15 mol %; 0 mol %≤$B_2O_3$≤12 mol %; 9 mol %≤$Na_2O$≤21 mol %; 0 mol %≤$K_2O$≤4 mol %; 0 mol %≤MgO≤7 mol %; and 0 mol %≤CaO≤3 mol %.

EXAMPLES

The following examples serve to more fully describe the manner of using the above-described disclosure, and to further set forth the best modes contemplated for carrying out various aspects of the disclosure. It is understood that these examples do not limit the scope of this disclosure, but rather are presented for illustrative purposes. The working examples further describe how to prepare the hybrids of the disclosure.

Example 1

Protective Polymer Film Application to Glass Surface

Many different methods are available to apply the porous polymer to the glass surface, including, for example, spray coating, ink-jet printing, dipping coating, and like methods. If desired, the glass surface can be cleaned with standard glass washing procedures prior to polymer application to provide consistent coating and etch, which promote consistent roughening properties in the final product.

Referring to the Figures, FIG. 1 illustrate aspects of the process. FIGS. 1(a) and (b) show possible options for applying the pore-forming polymer to a glass sheet (100), for example: spray-coating (105) a polymer solution (110) or ink-jet printing (115) polymer solution droplets (120), respectively. After the coating, the glass can optionally be cured, such as by thermal or UV methods, to increase polymer adhesion, for example, while in transit on a conveyor or while in an acid chamber. The curing conditions can depend on the polymer(s) selected. Then the polymer coated sheet (135) can be, for example, immersed vertically or horizontally into a chamber (125) containing an acid bath (130) for pre-determined time, as shown in FIG. 1(c). An alternative method is to place the glass on a conveyor which transports the glass sheet into and out of the acid tank. The residence time can be controlled, for example, with bath size and conveyor speed. Another alternative method is to directly spray acid (not shown) onto one or both sides of the polymer coated glass sheet (135).

Example 2

Etching the Glass Surface Having a Protective Polymer Film

Glass sheets having a protective polymer film prepared in accord with Example 1 were etched using various acid formulations with controlled variation in etch time and temperature, for example, according to an etch time of 5 minutes, acids concentration of 3 M HF and 3.6 M $H_2SO_4$, at ambient (25° C.) temperature, and like conditions.

After etching, the glass sheets can be removed from the acid chamber and placed into a rinse bath/chamber (e.g., DI water) to remove the acid and polymer from the surface of the substrate. The temperature of the rinse bath can be elevated to accelerate polymer removal if desired. If the polymer cannot be completely removed by the rinse step, additional suitable solvents can be applied to remove the polymer. Optionally, solvent can be added into or included in the rinse bath to ensure the complete removal of the acid and polymer concurrently. In particular embodiments, the polymer is not removed in the acid bath, since the residual polymer could interfere with the etching of subsequent glass sheets by, for example, interacting with the acid(s) to modify the concentration or by premature or excess exposure of the underlying surface area. To prevent polymer from prematurely peeling from the glass surface during the etching, agitation or motion of the glass or the liquid is avoided.

The etching solution can contain, for example, HF, or other suitable chemicals, such as $NH_4HF_2$, and salts thereof, which can etch the glass. To increase the acidity, other acids, such as HCl, $H_2SO_4$ or organic acids can be included in the solution. The etching time can be, for example, less than 10 min, such as about 1 min.

The purpose of the polymer coating is not to coat a uniform continuous film on the glass surface, but rather to provide a coated surface having porous or partially exposed areas. The small but numerous porous areas on the glass surface are not coated, i.e., they are un-coated or un-covered. During the acid etching, the porous areas of the glass surface are attacked by the acid, and the coated areas are protected by the polymer. Such differential etching creates a rough surface, which provides the target AG properties.

The percentage of un-covered porous area and the size of the porous openings can be controlled to attain the optical and visual appearance targets of the AG surface. FIG. 2 show the color microscopic images (presented in gray scale) with progressively decreasing polymer surface coverage and increasing porosity or open area. FIGS. 2a to 2h image series show the glass surfaces after the polymer was applied. Each image shows decreasing polymer surface coverage (black) and increasing porous area (white) on the glass surface. The gray color represents areas of intermediate thickness or thin polymer coverage. The increasing porous area percentages (%) were estimated to be 0.27, 1.4, 2.1, 3.8, 6.9, 9.2, 13.2, and 20.9, for FIGS. 2a to 2h, respectively.

FIG. 3 shows the relationship between DOI and the percentage of the un-covered area, i.e., polymer coated area having exposed area arising for pores or holes in the polymer layer. FIG. 3 charts the percentage of un-covered porous area on glass surface from polymer masking and the resulting DOI(20° measured after the acid etching. Two different acid concentrations were selected for direct comparison: a mixture of 3M HF and 3.6M $H_2SO_4$ (data points represented by diamonds); and a mixture of 2M HF and 2.4 M $H_2SO_4$ (data points represented by squares). Specifically, the data shows that with the same acid concentration, for example, 3 M HF and 3.6 M $H_2SO_4$, the DOI first decreases as the percentage of the un-covered porous area increases from 0 to about 1%, and then does not change significantly until the percentage increases to about 5%. Beyond 5%, the DOI increases as the percentage of the un-covered porous area increases. For very high polymer surface coverage (e.g., more than about 99%), even though the DOI can meet the specification (e.g., less than 70 for single side etching), such a region is less desirable. First, as shown in FIG. 3, the DOI is sensitive to even slight increases in the percentage of un-covered porous area. Secondly, the visual appearance is not good.

In embodiments, having a percentage of un-covered porous surface area larger than about 1% is particularly useful. As shown in FIG. 3, different DOI levels can be achieved with at least two methods: varying the porous polymer surface coverage; or varying the acid concentration. Normally, for single side etching, a DOI of about 50 to about 70 without significantly increasing the sparkle is particularly useful. To achieve this level, as shown in FIG. 3, the percentage of un-covered porous polymer area can be from about 10 to about 25% with 3M HF and 3.6 M $H_2SO_4$. The same DOI level can be also achieved by reducing the acid concentration (2 M HF/2.4 M $H_2SO_4$) and less un-covered porous polymer area (e.g., from about 1 to about 5%). The etch time in acid remains the same, i.e. about 1 min. For samples with low (e.g., less than about 5%) un-covered porous polymer area, the average size of the pore opening (the length of any straight line spanning the opening) can be, for example, less than about 50 micrometers. If the average size of the pore opening is larger, the number of openings will be less with the same amount un-covered porous area. Therefore, uniformity (visual appearance as defined above) may be reduced and sparkle may be higher. For samples with a large un-covered porous area (e.g., larger than about 5%), an average size of the pore opening of less than 30 micrometers is particularly useful.

As shown in the FIG. 4, haze decreases as DOI increases. If the DOI values of etched samples are about 50 to about 70, the haze value is below 5%, which is particularly useful for most display applications. FIG. 4(a) shows the relationship between the percentage of un-covered porous area from polymer masking, and the resulting haze measured after acid etching. FIG. 4(b) shows the correlation between haze and DOI. The two different acid concentrations (data points represented by diamonds and squares) used were those described above for FIG. 3.

Figure 5:
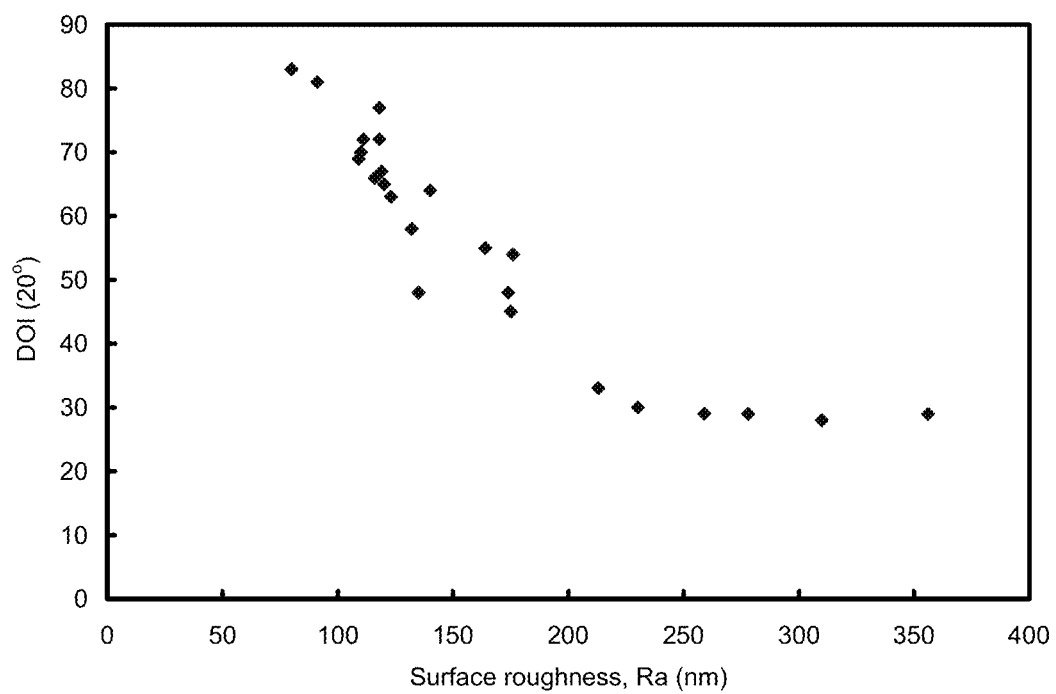
FIG. 5 shows a relationship between the percentage of surface roughness (Ra), and DOI (20°) for porous polymer masked surface that has been acid etched.

FIG. 5 shows the relationship between DOI and surface roughness (Ra), specifically the relationship between the percentage of surface roughness, Ra, and DOI (20°) for acid etched surface made with porous polymer masking. Generally, DOI decreases as surface roughness increases. For the typically targeted DOI of about 50 to about 70, low surface roughness is typically about 100 nm, which may reduce the sparkle compared to samples having higher surface roughness. The two different acid concentrations (data points represented by diamonds and squares) used were those described above for FIG. 3.

FIGS. 6a and 6b show two examples of microscopic images (at 200× magnification) of glass surfaces after etching and mask removal. The DOI values were 70 and 60, for FIGS. 6a and 6b, respectively. The percentages of the un-covered porous area before etching these two examples were 0.3 and 2.9%, respectively. Each dot (pit) on the images corresponds to a portion of the un-covered porous area after the polymer application. As shown in FIG. 6a, having higher (i.e., 99.7% and fewer pores) porous polymer surface coverage, the number of dots is much less than that of the slightly lower (97.1%) polymer surface coverage that produces the etched image in FIG. 6b. To generate a pleasing, uniform visual appearance, a significant feature can include, for example, having a higher density of dots, that is, the significantly depressed areas, which corresponds to an open area or pore after application of the polymer, and can be more than about 1% of the total surface area coverage. FIGS. 7a and 7b show the surface topography images of the two etched samples of FIGS. 6a and b having different porous polymer surface coverage. The measured surface roughness (Ra) of FIG. 7a was 176 nm; and 110 nm for FIG. 7b. The percentages of un-covered porous area within the polymer coated area before etching were 1% and 3.8% for FIGS. 7a and b, respectively.

FIG. 8 show a series of simulated images representing a surface having varying amounts of deposited spots that can provide useful variation in the masked surface area coverage and pore size or exposed area. Thus, FIG. 8a shows a four pixel array (800) having spot (805) coverage area and "open" (810) area. FIG. 8b shows the four pixel array of FIG. 8a further including a larger second spot (815) center on the array creating increased spot area coverage (four 805 spots plus a portion the 815 spot) and a corresponding decrease in "open" or uncovered area (817). FIG. 8c shows the four pixel array of FIG. 8a now having four enlarged primary spots (819) creating increased spot area coverage (four 819 spots) and a corresponding decrease in "open" or uncovered area (820) including a pore geometry resembling a "star". FIG. 8d shows the four pixel array of FIG. 8c now having four further enlarged primary spots (829) that create increased spot area coverage (four 829 spots) and a corresponding decrease in "open" or uncovered area (830) including a pore geometry that resembles a "diamond" or "square".

Figure 9:
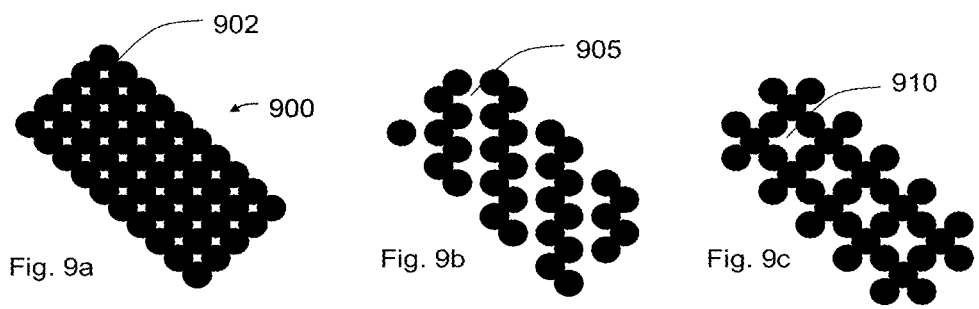
FIGS. 9a to 9f show a series of simulated images representing a coated surface that demonstrate variation in the number of the deposited polymer spots in a 5×10 array can provide variation in masked surface area coverage and variation in the pore size or exposed area, including pore geometric structure.
Figure 9:
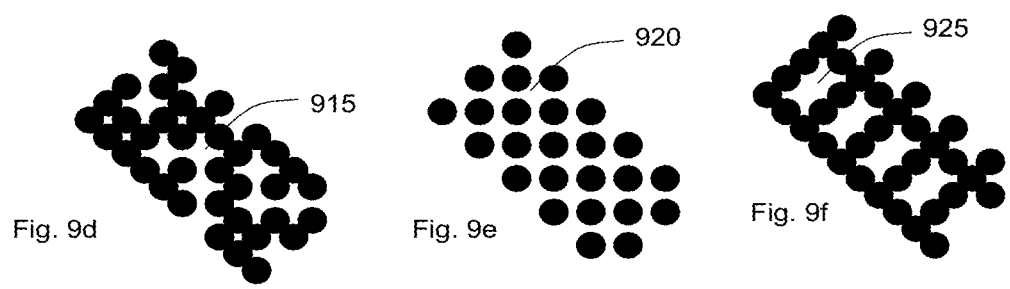

FIG. 9 show a series of simulated images representing a coated surface that demonstrate variation in the number of the deposited polymer spots in a 5×10 array can provide variation in masked surface area coverage and variation in the pore size or exposed area, including pore geometric structure. FIG. 9a shows a 5×10 array of packed spots (900) that produce a coated surface having "open" or uncovered area (920) including a pore geometry that resembles a "diamond" or a "square". FIG. 9b shows the 5×10 array of FIG. 9a having selective or systematic deletion of vertical spots that produce a coated surface having uncovered areas (905) having a pore geometry that resembles a linked-series of "maltese" crosses. FIG. 9c shows the 5×10 array of FIG. 9a having systematic deletion of alternate diagonal spots that produce a coated surface having uncovered areas (910) having a pore geometry that resembles a "Maltese" cross. FIG. 9d shows the 5×10 array of FIG. 9a having systematic deletion of selected spots that produce a coated surface having uncovered areas (915) having a pore geometry that resembles a series of four linked "Maltese" crosses. FIG. 9e shows the 5×10 array of FIG. 9a having systematic deletion of all alternate spots that produce a coated surface having an uncovered area (920) having a pore geometry that resembles a continuous series of linked "Maltese" crosses. FIG. 9f shows the 5×10 array of FIG. 9a having systematic deletion of two adjacent spots that produce a coated surface having an uncovered area (925) having a pore geometry that resembles a "twined cross".

In embodiments, "deletion" in the context of spot patterns refers, for example, to omitting or refraining from depositing selected spots during, for example, a controlled spray deposition or droplet printing process.

Figure 10:
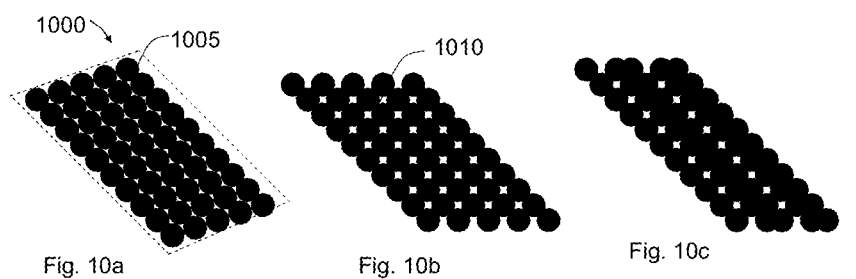
FIGS. 10a to 10f show another series of simulated images of a coated surface that demonstrate variation in the number of the spots, the relative orientation of the spots, the relative spatial arrangement, or the separation of the spots (i.e., pitch) in an array can provide further useful variation in spot surface area coverage and the resulting pore size or exposed area, including pore geometry.
Figure 10:
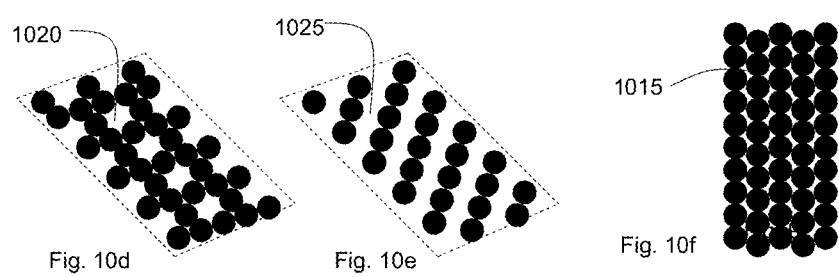

FIG. 10 show another series of simulated images of a coated surface that demonstrate variation in, for example, the number of the spots, the relative orientation of the spots, the relative spatial arrangement, the separation of the spots (i.e., pitch), and like permutations, or combinations thereof, in a spot array can provide further useful variation in spot surface area coverage and the resulting pore size or exposed area, including pore geometry. FIG. 10a shows a 5×10 array of close-packed spots (1000) that produce a coated surface having "open" or uncovered or pore area (1005) including a pore geometry that can resemble, for example, a "chevron" or a "bow-tie." FIG. 10b shows a 5×10 array of spots where adjacent columns of spots are slightly separated from the close-pack of FIG. 10a that produce a spot coated surface having uncovered or pore area (1010) including a pore geometry pattern that can resemble, for example, a series of staggered "squares stars."

FIG. 10c shows a 5×10 array of spots where one or more columns of spots is slightly compressed for greater overlay (less coverage) from the spacing of FIG. 10b with the result that pore geometry remains unchanged but the number of pores is effectively halved.

FIG. 10d shows a 5×10 array of spots having a vertical orientation and adjacent columns are slightly staggered with the result that the pore geometry changes to "bow-ties."

FIG. 10e shows a 5×10 array of spots as in FIG. 10a except having selective spot deletions which results in the pore geometry that resembles a "star burst" pattern (1020).

FIG. 10f shows a 5×10 array of spots as in FIG. 10a except having selective spot deletions which results in diagonal strings of spot and an open or continuous pore geometry (1025) pattern.

Figure 11:
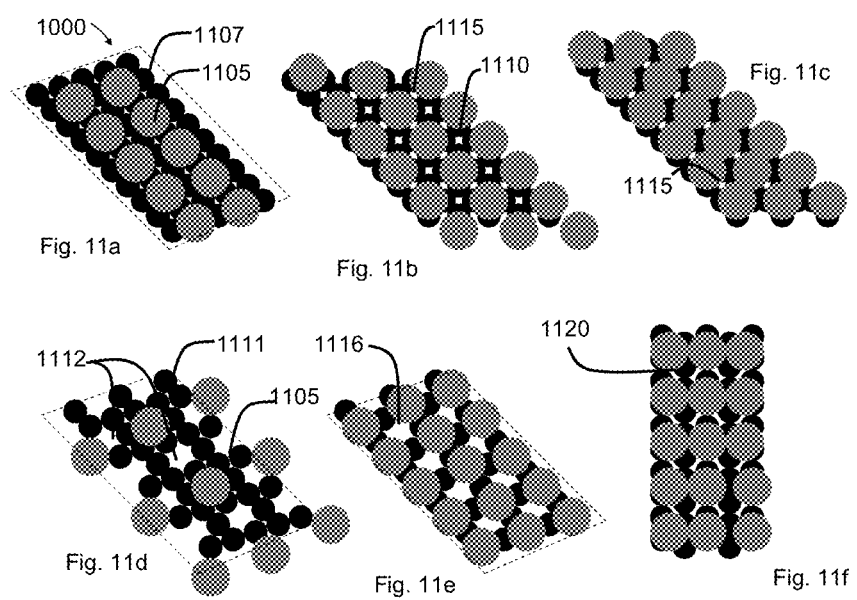
FIGS. 11a to 11f show another series of simulated images based on FIG. 10 that further include a second series of spots (in gray) that demonstrate that the resulting combined or aggregate spot variation can provide further useful variation in spot surface area coverage and the pore size or exposed area, including pore geometry.

FIG. 11 show another series of simulated images based on FIG. 10 that further include a second series of applied spots (in gray for clarity) that demonstrate that the combined or aggregate spot patterns and the resulting variation can provide further useful variation in spot surface area coverage and the pore size including pore geometry. FIG. 11a shows the 5×10 array of spots (1000) of FIG. 10a further including a second series of applied spots (gray) having a larger size but similar orientation where the pore geometry of FIG. 10a is reduced to a pattern of "diamonds" or opposing "chevrons" (1105). FIG. 11b shows the 5×10 array of spots of FIG. 10b further including the second series of spots (gray) having a larger size and greater spacing between spots but similar orientation to the first series of spots, where the resulting pore geometry of FIG. 11b is changed to an alternating pattern of "squares" (1110) and "lenses" (1115).

FIG. 11c shows the 5×10 array of spots of FIG. 10c further including the second series of spots (gray) having larger size and spacing between second spots but similar orientation to the first series of spots, where the resulting pore geometry of FIG. 11c is changed to only "lenses" (1115).

FIG. 11d shows the 5×10 array of spots of FIG. 10d further including the second series of spots (gray) having larger size and spacing between the second spots but similar angular orientation to the first series of spots, where the resulting pore geometry (i.e., the predominant repeating motif) of FIG. 11d is a combination of "bow-ties" (1111), "chevrons" (1105), and "star bursts" (1112).

FIG. 11e shows the 5×10 array of spots of FIG. 10e further including the second series of spots (gray) having larger size and spacing between the second spots but similar angular orientation to the first series of spots, where the resulting pore geometry of FIG. 11e is shrunken "star-bursts" (1116).

FIG. 11f shows the 5×10 array of spots of FIG. 10f further including the second series of spots (gray) having larger size and larger vertical separation between the second spots, where the resulting pore geometry of FIG. 11f is alternating angle "bow-ties" (1120).

In view of the foregoing illustrations and discussion it is apparent that many factors relating to spot deposition can influence spot surface coverage and the resulting pore size and geometry or geometries. Pore size and shape form factors that can be effected by deposited spots include, for example, spot area coverage, spot size, spot geometry (circles, ovals, and the like), spot overlap, mixed spot size combinations, spot deletions—systematic and random, spot randomness, spot numerosity, spot array pitch, x- and y-spot separation, and like considerations, and combinations thereof. The deposition of additional spots (second series, etc.) can increase or decrease spot randomness depending upon how the additional spots are deposited.

In embodiments, depending on the chemical composition and adherence properties of the spots, the spots can be vulnerable to peel or separation from the surface, especially when longer etch times are selected. Thus, the thickness of the deposited spots can be a factor in the differential etch rate of the substrate (e.g., glass; more HF susceptible) versus the coating (e.g., acrylate polymer; more $H_2SO_4$ susceptible). The thickness and durability (etch resistance) of the deposited spots can also be a factor in the uniformity or randomness of the resulting etched surface.

Example 3

Prophetic

Soda-Lime Glass Substrate.
Examples 1 and 2 are repeated with the exception that a soda-lime glass substrate was selected, such as glass composition 11 in Table 1. The resulting etched glass is expected to provide anti-glare properties that are comparable to those obtained for other like treated glass substrates.

Example 4

Prophetic

Pore-Forming Polymer.
Examples 1 and 2 are repeated with the exception that the substrate was spray coated with a pore forming polymer, such as the aforementioned TSO-3100 DOD ink or an acetone-based o/p-toluene sulfonamide formaldehyde resin, and then etched and stripped. The resulting etched glass is expected to provide anti-glare properties that are comparable to those obtained for other like treated glass substrates.

Example 5

Prophetic

Non-Pore-Forming Polymer Including Pore-Forming Particles.
Examples 1 and 2 are repeated with the exception that the substrate is spray coated with a non-pore forming polymer or resin containing fine particles of, for example, a water soluble salt or like particles, such as sodium chloride or sucrose. The particle size of the water soluble particles can be selected so that the particle diameter has a thickness greater than the coated polymer thickness. The particles protrude from the polymer film and provide sites for incipient pore formation when the particles are dissolved in a wash or etchant formulation. The coated surfaces are etched and stripped as disclosed herein. The resulting etched and stripped glass is expected to provide anti-glare properties that are comparable to those obtained for other like treated glass substrates.
Post-Etch Processing Example 6

Prophetic

Optional Ion Exchange.
Etched samples are optionally processed in a glass strengthening ion-exchange (IOX) step, tempering step, or both, and like processes before or after etching (see for example, the abovementioned commonly owned and assigned copending applications relating to strengthening and ion-exchange methods (IOX)).

Example 7

Prophetic

Optional Flaw Reduction.
If desired the etched surface can optionally be further processed to remove surface flaws or defects from the surface and to further enhance the strength, toughness or scratch resistance, and appearance properties of the surface (see for example, commonly owned and assigned U.S. Provisional Patent Application 61/293,032, filed Jan. 7, 2010, entitled "Impact-Damage-Resistant Glass Sheet") Thus, a glass sheet including at least one acid-etched surface as disclosed herein, alone or in combination with a tempering surface compression layer, is subjected to a combination of a surface tempering treatment and then an additional acidic etch treatment.

The resulting glass sheet exhibits high strength (ball drop) and is a useful component in damage-resistant consumer display devices.

The disclosure has been described with reference to various specific embodiments and techniques. However, it should be understood that many variations and modifications are possible while remaining within the scope of the disclosure.

What is claimed is:

1. A glass article comprising:
   at least one anti-glare surface having:
      a haze of less than about 25;
      a distinctness-of-image (DOI 20°) of about 25 to about 90; and
      a surface roughness (Ra) of about 100 to about 300 nm.

2. The glass article of claim 1 wherein the anti-glare surface is a protective cover glass for a display device.

3. The glass article of claim 1 wherein the anti-glare surface comprises a distribution of topographic features having an average diameter of about 1 to about 50 micrometers.

4. A display system comprising:
   a glass panel having at least one roughened surface prepared by the method comprising:
      forming a protective porous film on selected portions of at least one surface of the article wherein forming the protective porous film on selected portions of at least one surface comprises selective spray deposition, masked spray deposition, ink-jet deposition, or a combination thereof;
      contacting the at least one surface having the protective porous film with a liquid etchant; and
      removing the protective porous film from the surface of the article to form the antiglare surface, wherein removing the protective film from the surface of the article comprises at least one of: contacting the film with a dissolving liquid, heating the film to liquefy and drain, or a combination thereof,
   the glass panel including:
      a haze of less than about 25;
      a distinctness-of-image (DOI 20°) of about 25 to about 90; and
      a surface roughness (Ra) of about 100 to about 300 nm, which properties provide an anti-glare surface; and
   a pixelated image-display panel adjacent to the glass panel.

5. The system of claim 4 wherein the uniformity of the glass panel surface is excellent having an absence of detectable defects.

* * * * *